United States Patent [19]

Yamada

[11] Patent Number: 5,620,017
[45] Date of Patent: Apr. 15, 1997

[54] PRESSURE REGULATING SYSTEM FOR A FIRE EXTINGUISHING FACILITY

[75] Inventor: Hitoshi Yamada, Tokyo, Japan

[73] Assignee: Nohmi Bosai Ltd., Tokyo, Japan

[21] Appl. No.: 325,204

[22] PCT Filed: Feb. 17, 1994

[86] PCT No.: PCT/JP94/00244

§ 371 Date: Oct. 17, 1994

§ 102(e) Date: Oct. 17, 1994

[87] PCT Pub. No.: WO94/19632

PCT Pub. Date: Sep. 1, 1994

[30] Foreign Application Priority Data

Feb. 18, 1993 [JP] Japan ................................ 5-029464

[51] Int. Cl.$^6$ ........................................ F16K 17/30
[52] U.S. Cl. ............................ 137/312; 137/489.5
[58] Field of Search ...................... 137/489, 489.5, 137/491, 312 I

[56] References Cited

U.S. PATENT DOCUMENTS

| | | | |
|---|---|---|---|
| 1,228,104 | 5/1917 | Fulton | 137/489 |
| 2,037,179 | 4/1936 | Robart et al. | 137/489.5 |
| 2,644,479 | 7/1953 | Rowley | 137/312 |
| 3,143,134 | 8/1964 | Karpis | 137/489 X |
| 3,298,390 | 1/1967 | DeGraaf | |
| 3,515,165 | 6/1970 | Zadoo | 137/491 X |
| 3,692,050 | 9/1972 | Deters | 137/491 |
| 3,805,823 | 4/1974 | Kakegawa | 137/489 |
| 4,231,393 | 11/1980 | Byfuglien | 137/491 |
| 4,325,406 | 4/1982 | Bron | |
| 4,402,341 | 9/1983 | Reip | 137/489 |
| 5,097,746 | 3/1992 | Asaoka et al. | 137/491 X |
| 5,131,427 | 7/1992 | Latza | |

FOREIGN PATENT DOCUMENTS

| | | | |
|---|---|---|---|
| 2188867 | 1/1974 | France | |
| 887697 | 1/1962 | United Kingdom | 137/491 |
| 87/05134 | 8/1987 | WIPO | |

Primary Examiner—Stephen M. Hepperle
Attorney, Agent, or Firm—Wenderoth, Lind & Ponack

[57] ABSTRACT

In a pressure regulating system for a fire extinguishing facility, a primary side and a secondary side of a body of a pressure regulating valve is isolated from each other by a main valve. An internal valve chamber which is in communication with the primary side is formed on the back side of the main valve. Further, a pressure regulating pilot valve is formed such that a valve disk thereof is disposed so as to be pressed against a valve seat by a spring positioned within a valve chamber into which the primary pressure is introduced. The pressure receiving area of a first surface for receiving pressure in the direction of opening of valve disk and the pressure receiving area of a second surface for receiving a pressure in the valve closing direction are substantially equal to each other.

18 Claims, 9 Drawing Sheets

FIG. 11

PRESSURE REGULATING SYSTEM FOR A FIRE EXTINGUISHING FACILITY

TECHNICAL FIELD

This invention relates to a pressure regulating system for a fire extinguishing facility to be used, for example, in a fire extinguishing sprinkler system.

BACKGROUND ART

In the sprinkler fire extinguishing system of a high-rise building, a pressure regulating system having a pressure regulating valve and a pressure regulating pilot valve is provided to regulate the water pressure to be supplied to the sprinkler heads. By operation of the pressure regulating pilot valve, the interior of a secondary side of the pressure regulating valve is regulated to a steady pressure.

The degree of opening of a conventional pressure regulating valve is regulated by a spring urging the valve and a piston fixed thereto toward a closed position of the valve. The piston is fitted in a cylinder and the cylinder is connected to a secondary side of the pressure regulating pilot valve. As a result, the pressure regulating pilot valve causes the piston to slide together with the valve disk in accordance with changes in water pressure on the secondary side of the pressure regulating valve to vary the degree of opening of the pressure regulating valve.

The primary side of the pressure regulating pilot valve is connected to the primary side of the pressure regulating valve and the secondary side of the pressure regulating pilot valve is connected to the cylinder of the pressure regulating valve. Further, the valve disk of the pressure regulating pilot valve is connected to a shaft which is urged toward the open position of the valve. This shaft is connected to a diaphragm in an operation chamber and the operation chamber is in communication with the secondary side of the pressure regulating valve.

When water pressure of the secondary side of the pressure regulating valve is increased, the diaphragm in the operation chamber of the pressure regulating pilot valve is raised and the shaft is caused to slide toward the valve closing direction. When the secondary side water pressure of the pressure regulating valve is reduced, the diaphragm in the operation chamber of the pressure regulating pilot valve is lowered and the shaft is caused to slide toward the valve opening direction. The water pressure being supplied to the cylinder of the pressure regulating valve from the pressure regulating pilot valve is controlled by the sliding shaft.

In a sprinkler fire extinguishing system, water pressure may be abruptly increased for example at the time of starting a pump, or water pressure may be dropped for example due to the opening of a plurality of sprinkler heads. In a conventional pressure regulating valve, such forces are continuously applied on the main valve and it has been difficult to regulate the secondary pressure for a relatively wide range of the primary pressures. In other words, if the pressure on the primary side varies over a relatively wide range, forces acting upon the main valve due to the primary pressure vary when an attempt is made to maintain a certain degree of opening of the main valve is by the pressure regulating operation. Therefore the main vale is shifted from a predetermined degree of opening and the secondary pressure is shifted from a predetermined pressure.

Further, in a conventional pressure regulating pilot valve, if fluctuation occurs in the primary pressure, the degree of opening of the main valve is affected, since a large force acts upon one of the upper surface or the lower surface of the main valve. In other words, if the primary pressure changes when the pressure regulating valve is adjusting the degree of opening of the pressure regulating valve to regulate the secondary pressure, the degree of opening of the pressure regulating pilot valve is changed and the internal pressure of the cylinder of the pressure regulating valve is caused to change. As a result, the degree of opening of the pressure regulating valve changes and as result it is difficult to maintain the secondary pressure of the pressure regulating valve at a predetermined value.

Further, in the known prior art, a sealing force in the closed state of the valve is maintained by adjusting the elastic force of a spring which fuses the valve toward a closed position. However, while the sealing force is increased as the elastic force of the spring is increased, regulating operation on the degree of opening of the valve then becomes more difficult and a fine adjustment thereof becomes impossible. On the other hand, while regulation on the degree of opening of the valve becomes easier by reducing the force of the spring, it is more and more affected by a change in the primary side water pressure and there is a possibility of an undesirable opening of the valve. Thus, it is difficult to maintain a suitable sealing force by adjusting the elastic force of the spring.

In view of the above, it is an object of this invention to provide a pressure regulating system capable of operating steadily even when the primary pressure of the pressure regulating valve fluctuates.

Further, it is another object of the present invention to provide a pressure regulating system having a pressure regulating valve capable of providing a sufficient sealing force when the valve is closed.

SUMMARY OF THE INVENTION

A pressure regulating system for a fire extinguishing facility according to a first aspect of the invention includes a pressure regulating valve and a pressure regulating pilot valve for controlling the degree of opening of the pressure regulating valve in accordance with a secondary pressure of the pressure regulating valve. The pressure regulating pilot valve includes a valve chamber into which a primary pressure is introduced and which is formed with a valve seat; a valve disk disposed within said valve chamber; and an urging or biasing means for pressing said valve disk against the valve seat in said valve chamber, said valve disk being formed such that a first pressure receiving area for receiving a pressure in valve opening direction and a second pressure receiving area for receiving a pressure in valve closing direction from the primary pressure introduced into said valve chamber are substantially equal to each other.

A pressure regulating system for a fire extinguishing facility according to a second aspect of the invention includes a pressure regulating valve and a pressure regulating pilot valve for controlling the degree of opening of the pressure regulating valve in accordance with a secondary pressure of the pressure regulating valve. The pressure regulating valve includes a valve body; a main valve for isolating a primary side from the secondary side in said valve body; and an internal valve chamber which is provided on the back of said main valve and is in communication with the primary side of said valve body.

A pressure regulating system for fire extinguishing facility according to a third aspect of the invention includes a pressure regulating valve and a pressure regulating pilot valve for controlling the degree of opening of the pressure regulating valve in accordance with the secondary pressure of the pressure regulating valve. The pressure regulating valve includes a valve body; a main valve for isolating a primary side from the secondary side in said body; a valve seat for the seating of said main valve; and a skirt provided on said main valve and fitted to the primary side of said valve seat; the diameter of fitting portion of said skirt being formed to be the same as the diameter of the primary side of said valve seat.

DETAILED DESCRIPTION OF THE INVENTION

An embodiment of this invention will now be described by way of the accompanying drawings. The essential features of a pressure regulating system for a fire extinguishing facility will first be described by way of FIG. 1 and a pressure regulating valve NSV and a pressure regulating pilot valve PV will thereafter be described, respectively, in detail. In the normal state of operation, the pressure regulating valve NSV is in its closed state, where the interior of a secondary side piping 2P is filled with water at a relatively low pressure by means of the pressure regulating pilot valve PV and a pressure relief pilot valve LV. The pressure relief pilot valve LV is to be opened when the water pressure within the secondary side piping 2P is excessively increased.

Figure 1:
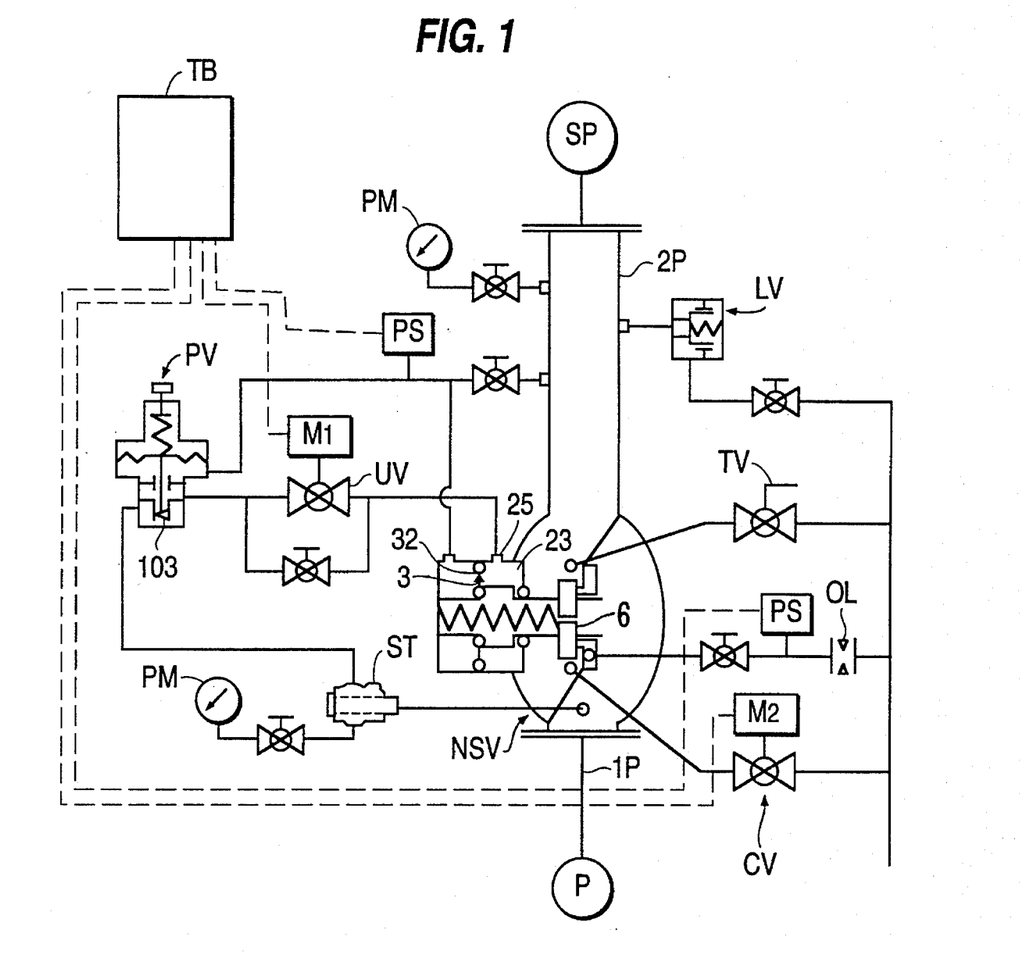
FIG. 1 is a block diagram showing a pressure regulating system for a fire extinguishing facility according to an embodiment of this invention.

When a fire detector, which is not shown, has detected a fire, a fire signal is sent to a terminal box TB whereby a motor M1 is started to open a starting valve UV.

A valve disk 103 of the pressure regulating pilot valve PV is pressed down to open the valve when pressure within the secondary side piping 2P is lower than a set pressure of the pressure regulating pilot valve PV, i.e., by a pressure drop as a result of opening of a closure type sprinkler head within a sprinkler facility SP which is connected to the secondary side piping 2P. Then, pressurized water within a primary side piping 1P connected to a pump P enters a pressure application opening 25 of the pressure regulating valve NSV through the pressure regulating pilot valve PV, so as to pressurize a cylinder primary side chamber 23. As a result, a piston 3 is displaced toward the valve opening direction, the degree of opening of the pressure regulating valve NSV is increased and pressure within the secondary side piping 2P is increased.

When pressure within the secondary side piping 2P is increased and becomes higher than the set pressure, the valve disk 103 of the pressure regulating pilot valve PV is pushed up to be displaced toward the valve closing direction. The pressurized water within the cylinder primary side chamber 23 is then discharged into the secondary side piping 2P via a through hole 32 in the piston 3. As a result, the main valve 6 is pushed down to throttle the flow of the pressurized water from the primary side piping 1P to the secondary side piping 2P, pressure within the secondary side piping 2P is reduced.

By repeating the above operation, the secondary pressure is maintained at a preset pressure despite fluctuations in the flow or primary pressure.

During an inspection, the starting valve UV is opened and, instead discharging of water from the sprinkler head in the sprinkler facility SP, a motor M2 is remote-controlled to open a remote test valve CV. Thereby, a condition identical to that at the time of a fire is produced and a test of the system as a whole becomes possible.

It should be noted that, in FIG. 1, TV for a test valve, ST for a strainer, OL for an orifice, PM for a pressure gauge, PS for a pressure switch are used to indicate the respective components.

Figure 2:
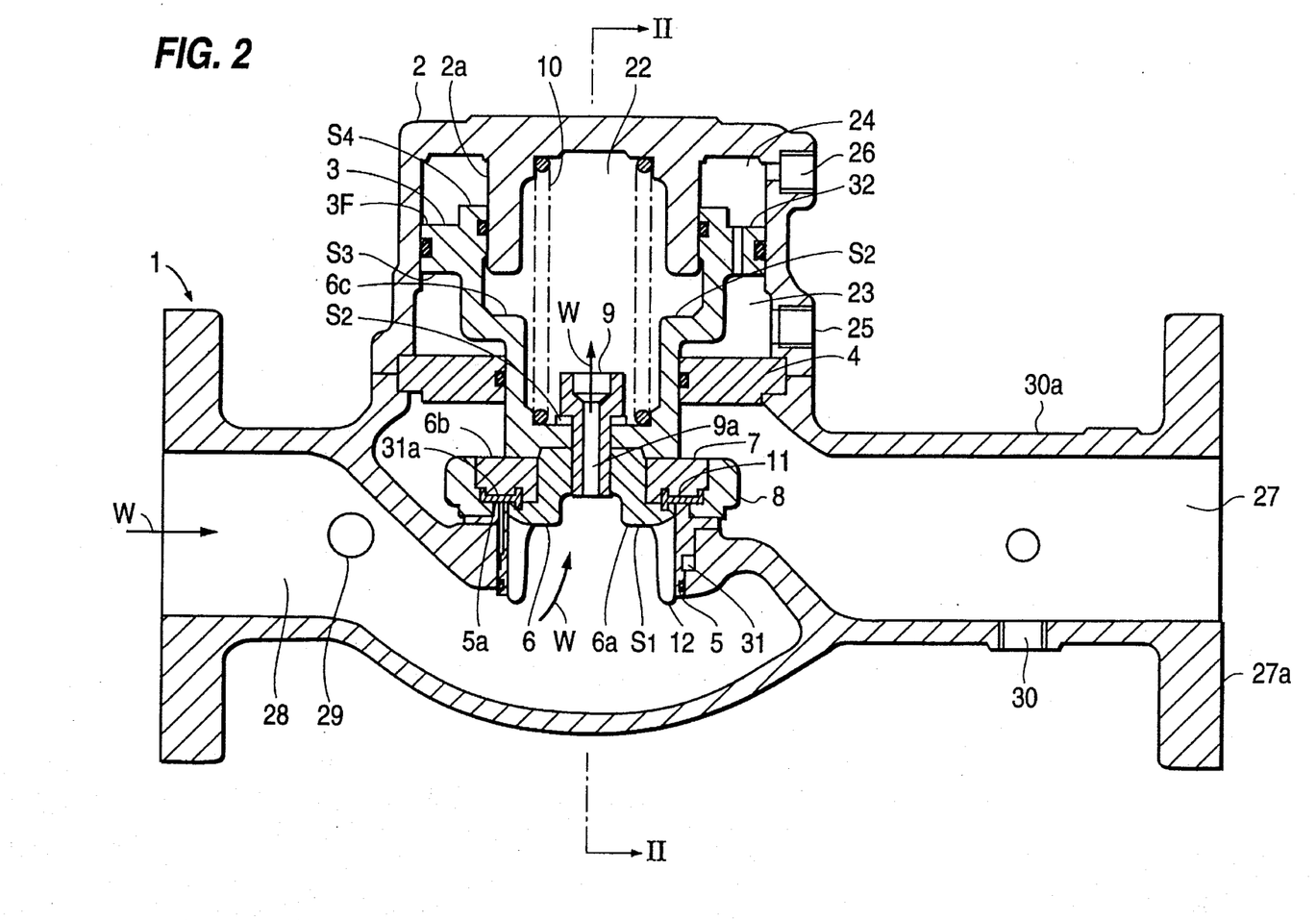
FIG. 2 is a longitudinal sectional view showing a pressure regulating valve used in the embodiment.
Figure 3:
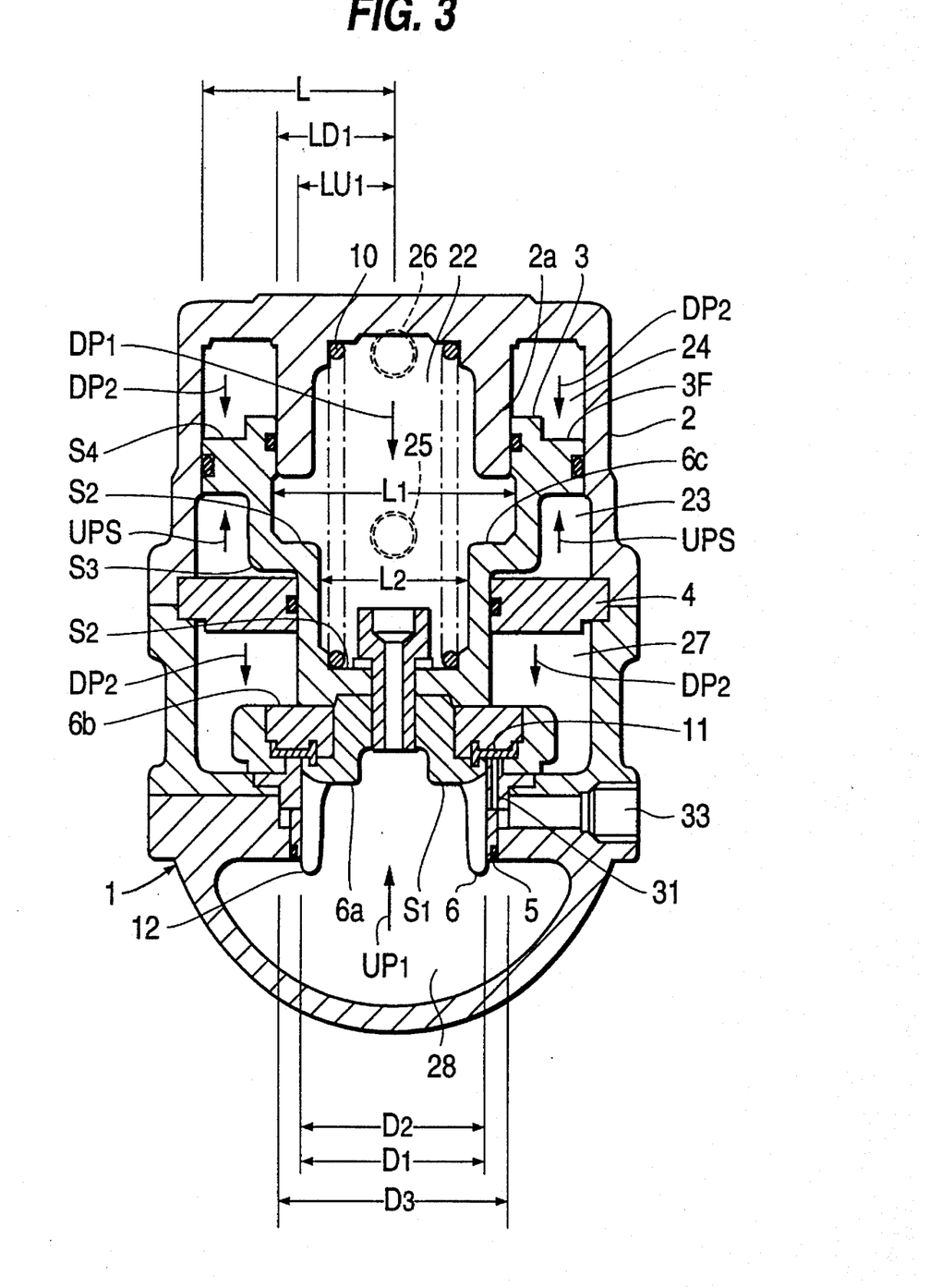
FIG. 3 is a sectional view taken along line II—II of FIG. 2.
Figure 4:
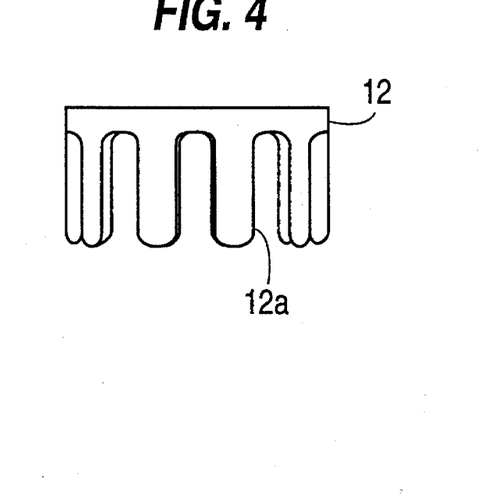
FIG. 4 is a front view showing a skirt used in the pressure regulating valve of FIG. 2.

Construction of the pressure regulating valve NSV will now be described by way of FIGS. 2 to 4. As shown in FIGS. 2 and 3, the pressure regulating valve NSV has a primary side 28 and a secondary side 27 of the body thereof which are isolated from each other by a main valve 6. A seat 11 for abutting against a seat ring 5 is provided on the main valve 6. The seat 11 is clamped by an inner seat holder 7 and an outer seat holder 8. The seat ring 5 is formed to have a double valve seat and the inner diameter thereof is D1. Further, a flow inlet 31a of a flowing water detection chamber 31 against which the seat 11 abuts is provided on a seating portion 5a of the seat ring 5. The flowing water detection chamber 31 is connected to a flowing water outlet 33.

A skirt 12 for abutting against the inner peripheral surface of the seat ring 5 is caused to project from a lower surface 6a of the main valve 6. The skirt 12 is provided to be a guide for the displacement of the main valve 6, and, as shown in FIG. 4, it is of a right circular cylinder having an outer diameter (fitting diameter) D2 and has a plurality of slits 12a in the axial direction thereof. A piston 3 is fixed to an upper surface 6b of the main valve 6 through a bypass bolt 9. Since, in this manner, the bypass bolt 9 is used to fix the main valve 6 and the piston 3 to each other, a bore extending through the main valve 6 and the piston 3 may be readily formed by providing a through hole 9a in the bypass bolt 9. Accordingly, intricate works are not necessary such as of providing through holes in the main valve and the piston, respectively, and completing the fixing operation while positioning these holes.

As shown in FIG. 3, an inner diameter L1 at the upper portion of the piston 3 is formed to be larger than an inner diameter L2 at the lower portion thereof. An outer diameter at this lower portion is 2.LU1 and is equal to the outer diameter D2 of the skirt 12 and to the inner diameter D1 of the seat. While the piston 3 is fitted to a tubular guide portion 2a of a cylinder case 2, formed inside these portions is an internal valve chamber 22 which is in communication with the primary side 28.

A spring 10 for urging the piston 3 toward the valve closing direction is provided in a compressed manner within the internal valve chamber 22. A horizontal wall portion 3F is formed at the outer peripheral portion of the piston 3 so as to partition the outer peripheral portion of the piston 3 into a cylinder primary side chamber 23 and a cylinder secondary side chamber 24, and a through hole 32 for communicating the cylinder primary side chamber 23 and secondary side chamber 24 with each other is formed in the horizontal wall portion 3F. The piston 3 is fitted to a separation wall 4, and the separation wall 4 provides a partition between the cylinder primary side chamber 23 at the outside of the piston 3 and the secondary side 27.

Pressure application opening 25 to be connected to the pressure regulating pilot valve PV is provided at the cylinder primary chamber 23, and a water flow inlet 26 is provided at the cylinder secondary side chamber 24.

Pressure receiving area of a pressure receiving surface S1 of the lower surface 6a of the main valve 6 is $\pi LU1^2$. while the pressure receiving area of a pressure receiving surface S2 of a back side 6c of the main valve 6 is $\pi LD1^2$. Since, as shown in FIG. 3, the radius LD1 of the pressure receiving surface S2 is larger than the radius LU1 of the pressure receiving surface S1, the pressure receiving surface S2 has a larger pressure receiving area than the pressure receiving surface S1.

Pressure receiving area of a pressure receiving surface S3 of the piston 3 at the cylinder primary side chamber 23 is $\pi (L^2-LU1^2)$ when the inner diameter of the cylinder case 2 is 2L, while pressure receiving area of a pressure receiving surface S4 of the piston 3 at the cylinder secondary side chamber 24 is $\pi (L^2-LD1^2)$. Since, as described, the radius LU1 is smaller than the radius LD1, the pressure receiving surface S3 has a larger pressure receiving area than that of the pressure receiving surface S4.

A short tubular portion 30a having a flange 27a and provided with a secondary pressure extracting opening 30 is formed at the secondary side 27 of the body 1; since the short tubular portion 30a is remote from the main valve 6, the secondary side pressurized water flowing therethrough is caused to flow in its rectified state. Therefore, a secondary pressure may be readily extracted accurately in its rectified state without forming a branch piping exclusively for use in extracting the secondary pressure on the secondary side piping from the pressure regulating valve.

Figure 5:
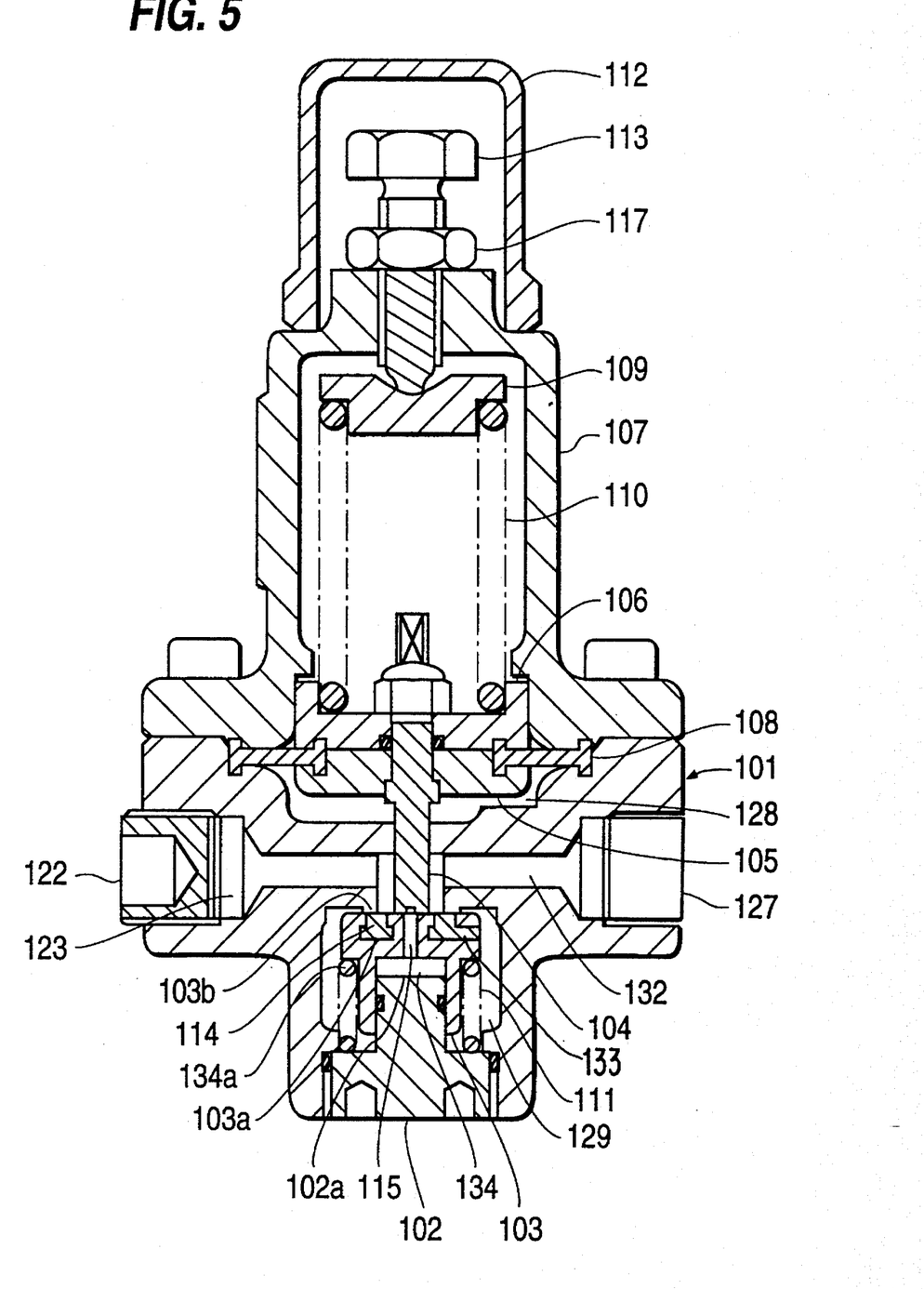
FIG. 5 is a longitudinal sectional view showing a pressure regulating pilot valve used in the embodiment.
Figure 6:
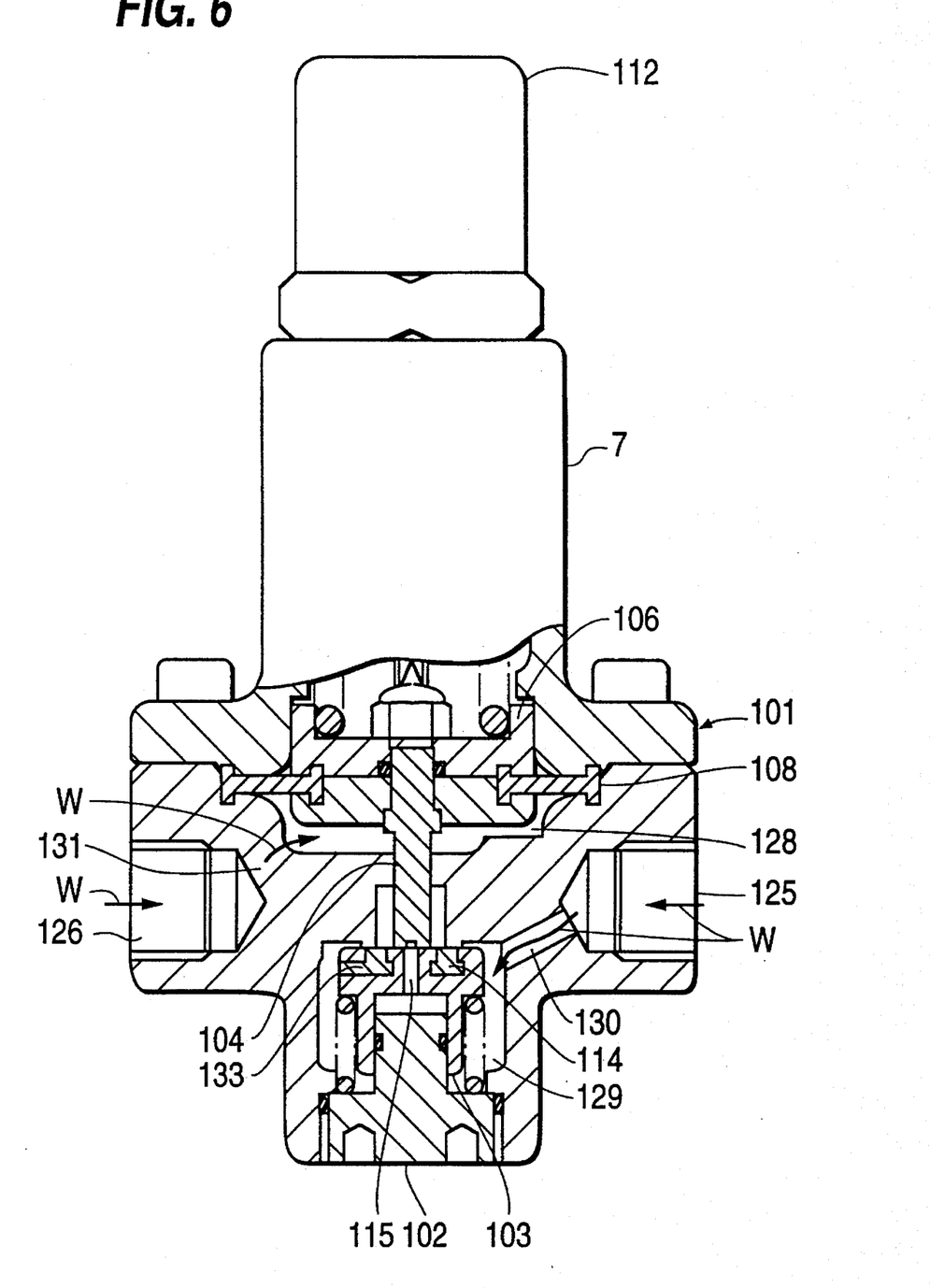
FIG. 6 is a partially sectional front view of the pressure regulating pilot valve of FIG. 5.

Construction of the pressure regulating pilot valve PV will now be described by way of FIGS. 5 to 7. As shown in FIGS. 5 and 6, a valve body 101 has connecting openings in four directions. These connecting openings comprise: a primary side connecting opening 125 which is in communication with a primary pressure extracting opening 29 of the pressure regulating valve NSV; a secondary side connecting opening 126 which is in communication with a secondary pressure extracting opening 30 of the pressure regulating valve NSV; a cylinder connecting opening 127 which is in communication with the cylinder primary side chamber 23 of the pressure regulating valve NSV; and a closed connecting opening 123 which is sealed by a plug 122.

A valve chamber 129 is formed within the body 101. The lower portion of the valve chamber 129 is sealed by a plug 102, and the valve chamber 129 is in communication with the primary side connecting opening 125 through a bore 130 formed on the side wall thereof. As shown in FIG. 7, a valve disk 103 having a radius RL to be seated on a projecting valve seat 133 by the pressing force of the spring 111 is provided in the valve chamber 129. A cylinder 134 and a spring attaching portion 134a are provided on a lower surface 103a of the valve disk 103, and a guide portion 102a of the plug 102 is fitted in the cylinder 134.

An inner radius R2 of the cylinder 134 is formed to be equal to a radius R1 of an opening portion 133a of the valve seat 133. Therefore, a pressure receiving area $\pi (RL^2-R2^2)$ of a stepped pressure receiving surface S10 of the lower surface 103a of the valve disk 103 when the valve is opened and a pressure receiving area $\pi (RL^2-R1^2)$ of a pressure receiving surface S11 at the outside of seating of the upper surface 103b of the valve disk 103 are equal to each other.

Further, the pressure receiving area of a pressure receiving surface S12 inside the valve seat on the upper surface of the valve disk 103 is $\pi R1^2$ and the pressure receiving area of an inner side pressure receiving surface S13 of the cylinder is $\pi R2^2$; since the radius R1 and the radius R2 are equal to each other, the pressure receiving areas respectively of the pressure receiving surfaces S12 and S13 are equal to each other.

A seat 114 for abutting the valve seat 133 and a through hole 115 for communicating with the interior of the cylinder 134 are provided on the upper surface 103b of the valve disk 103. Further, one end of a shaft 104 which is urged toward the valve closing direction by a spring 110 is caused to abut against the upper surface 103b of the valve disk.

The other end of the shaft 104 is fixed to a diaphragm 108; the diaphragm 108 is disposed within an operation chamber 128 in a manner clamped by a diaphragm holder 105 and a piston 106. The operation chamber 128 is in communication with the secondary side connecting opening 126 through a bore 131.

Pressurized water W from the secondary side piping 2P is introduced into the operation chamber 128 through the bore 131 and the secondary side connecting opening 126; on the other hand, pressurized water W from the primary side piping 1P is introduced into the valve chamber 129 through the bore 130 and the primary side connecting opening 125.

It should be noted that numeral 107 denotes a casing, numeral 109 denotes a spring shoe for the spring 110, and numeral 112 denotes a cap for preventing a malicious mischief.

Operation of the pressure regulating valve NSV will now be described. Pressure application opening 25 of the cylinder primary side chamber 23 is connected to the cylinder connecting opening 127 of the pressure regulating pilot valve PV, and a predetermined cylinder pressure is introduced into the cylinder primary side chamber 23 from the pressure regulating pilot valve PV when it is desired to open the pressure regulating valve NSV for example at the time of pressure drop in the secondary side piping 2P.

Figure 8:
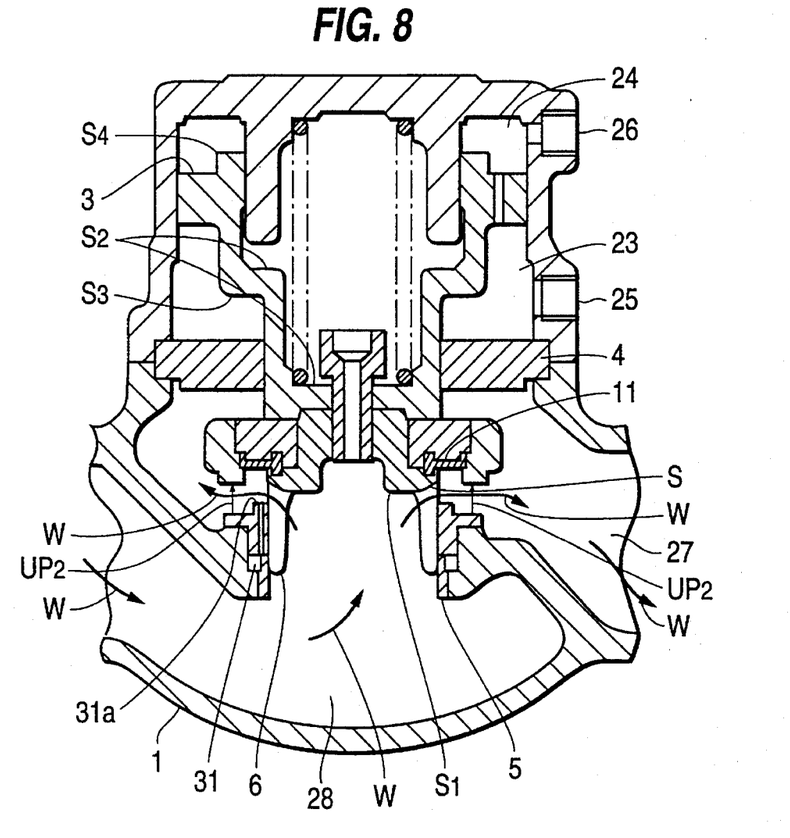
FIG. 8 is an enlarged view of certain portions of FIG. 2 showing the pressure regulating valve in its opened state.

Since the piston 3 is then pressed toward the opening direction, the main valve 6 is displaced in the direction of its opening as shown in FIG. 8 so that it is moved away from the seat ring 5, causing the valve to open. As a result, pressurized water W in the primary side 28 of the pressure regulating valve NSV flows into the secondary side 27 and the pressurized water flows into the flowing water detection chamber 31 from the flow inlet 31a, thereby informing of the opening of the main valve 6.

When the pressure in the secondary side piping 2P is increased by the pressurized water W, the pressure in the operation chamber 128 of the pressure regulating pilot valve PV increases and the diaphragm 108 is moved in the valve closing direction; therefore, the degree of opening of the pressure regulating pilot valve PV is smaller and the cylinder pressure to be supplied to the cylinder primary side chamber 23 of the pressure regulating valve NSV also becomes lower. As a result, since the piston 3 is moved toward the valve opening direction, pressure at the secondary side 27 is lowered.

In this manner, the pressure regulating valve NSV regulates the degree of opening of the main valve 6 through the piston 3 while being controlled by the pressure regulating pilot valve PV, so as to control the flow into the secondary side 27 of the pressurized water W from the primary side 28 to regulate the pressure at the secondary side 27.

While such degree of opening of the main valve 6 is balanced by the elastic force of the spring 10, a force acting upon the main valve by the pressure of the primary side 28, a force acting upon the piston 3 by the cylinder pressure within the cylinder primary side chamber 23, and a force acting upon the piston 3 by the pressure of the secondary side 27, the forces acting upon the main valve 6 are controlled so that fluctuation in the respective pressure does not affect the degree of opening of the main valve 6.

The pressure of the primary side 28 acts upon the main valve 6; as shown in FIG. 3, a force UP1 in the valve opening direction acts upon the pressure receiving surface S1 of the lower surface 6a of the main valve 6, and a force DP1 in the valve closing direction acts upon the pressure receiving surface S2 of the back surface 6C thereof due to the pressurized water W entered the internal valve chamber 22 through the bore 9a of the bypass bolt 9. At this time, since the pressure receiving area $\pi \, LU1^2$ for receiving the force UP1 in the valve opening direction is somewhat smaller than the pressure receiving area $\pi \, LD1^2$ for receiving the force DP1 in the valve closing direction, the force acting upon the main valve 6 in the valve closing direction is somewhat larger than that in the valve opening direction.

For this reason, the pressure of the primary side 28 acting upon the main valve 6 continuously urges the main valve in the valve closing direction. Accordingly, even when the pressure of the primary side 28 is abruptly increased, a force in the valve closing direction is applied on the main valve 6. Therefore increasing of the pressure of the primary side 28 has an effect of also increasing the pressure of the secondary side 27.

In its normal state, the pressure of the secondary side 27 is smaller comparing to the pressure of the primary side 28; such pressure of the secondary side 27 consists of the force DP2 in the valve closing direction applied on the upper surface 6b of the main valve 6. Further, a force UPS pushing the piston 3 in the valve opening direction is applied by the pressurized water W within the cylinder primary side chamber 23, and a force DP2 pushing the piston 3 in the valve closing direction is applied by the pressurized water W within the cylinder secondary side chamber 24.

When an abrupt drop in the pressure of the secondary side 27 occurs, since it is not directly transferred to the cylinder pressure, the force UPS in the valve opening direction does not become smaller while the force DP2 in the valve closing direction becomes smaller.

In other words, the pressure regulating valve NSV regulates the pressure of the secondary side 27 while causing the movement of the main valve 6 not to be affected by fluctuation in the pressure of the primary side 28, by forming the internal valve chamber 22 on the side of the back surface 6c of the main valve 6 so that, to the extent possible, water pressures applied on the main valve except for those to be used in regulating the degree of opening are offset by each other.

In this embodiment, the boundary between the primary pressure and the secondary pressure is continuously maintained at a certain position irrespective of the degree of opening of the main valve 6. In other words, when pressure control is effected at a position where the degree of opening of the main valve 6 is very small when the valve has just started to open, the flowing water is regulated by a gap S between the seat 11 and the inside of the seat ring 5 as shown in FIG. 8. At this time, the primary pressure UP1 is applied on the inside of the inner diameter D1 of the seat ring 5 and the secondary pressure UP2 is applied on the outside thereof.

On the other hand, when the main valve 6 is regulated at a position where the degree of opening is relatively large, the flowing water is regulated by the skirt 12. At this time, the primary pressure UP1 is applied on the inside of the outer diameter D2 in the skirt 12 and the secondary pressure UP2 is applied on the outside thereof.

Since the inner diameter D1 of the seat ring 5 and the outer diameter D2 of the skirt 12 are equal to each other, there is little fluctuation in the pressure receiving area respectively of the primary pressure and the secondary pressure that occurs due to displacement of the main valve 6 from its totally closed state to its fully opened state. In other words, a force tending to open or to close the main valve 6 due to fluctuation in the pressure receiving area will not occur. Thus, pressures in the cylinder primary side chamber 23 and secondary side chamber 24 are regulated and a steady pressure control is performed by the main valve 6 which is moving while continuing to maintain balance of the forces.

Further, the pressure control is even more stabilized by providing the skirt 12 on the main valve 6. In other words, since the skirt 12 provided with a plurality of slits 12a as shown in FIG. 4 it is capable of mitigating pressure fluctuation in the opening area associated with changes in the degree of opening of the main valve 6.

The above pressure regulating valve NSV is constructed such that flowing water at the primary pressure is caused to flow to the outer side from the inner side at which the skirt 12 is positioned with respect to the seat ring 5. It is important to keep the water flowing in this direction. If the direction of flow is reversed, the following problems occur.

That is, pressure control is effected when the opening of the main valve is very small and the flowing water is regulated by a gap formed between the seat ring 5 and the outer side thereof. At this time, the primary pressure is applied on the outer side of the outer diameter D3 of the seat ring 5 and the secondary pressure is applied on the inner side thereof. On the other hand, when pressure is regulated when the opening of the main valve 6 is relatively large, the flowing water is regulated by the skirt 12. The primary pressure is applied on the outer side of the outer diameter D2 of the skirt and the secondary pressure is applied on the inner side thereof.

Since the outer diameter D2 of the skirt 12 is smaller than the outer diameter D3 of the seat ring 5, a force corresponding to difference in the area between those of the above outer diameter D2 and outer diameter D3 is applied on the main valve 6 due to pressure difference between the primary pressure and the secondary pressure as the degree of opening of the valve 6 changes. As a result, the balance of the forces acting upon the main valve 6 is lost and pressure control based on the degree of opening of the main valve 6 becomes unstable.

Operation of the pressure regulating pilot valve PV will now be described. The spring pressure of pilot valve PV adjusted by an adjusting screw 113 such that separation which results between the valve disk 103 and the valve seat 133 is a predetermined value when the secondary pressure is at a set value. The adjusting screw 113 is fixed by means of a nut 117.

When the secondary pressure in the secondary side piping 2P is higher than the set value, the water pressure in the operation chamber 128 is increased and displaces the diaphragm 108 upward. Accordingly the piston 106 is pushed up against the bias of the spring 110 and the shaft 104 is displaced upwardly. As a result, because the valve disk 103 is seated on the valve seat 133, a closed state of the valve results and the supply of pressurized water W from the primary side to the secondary side is cut off. Accordingly, the supply of pressurized water W from the pressure regulating pilot valve PV to the cylinder primary side chamber 23 of the pressure regulating valve NSV is terminated.

Figure 9:
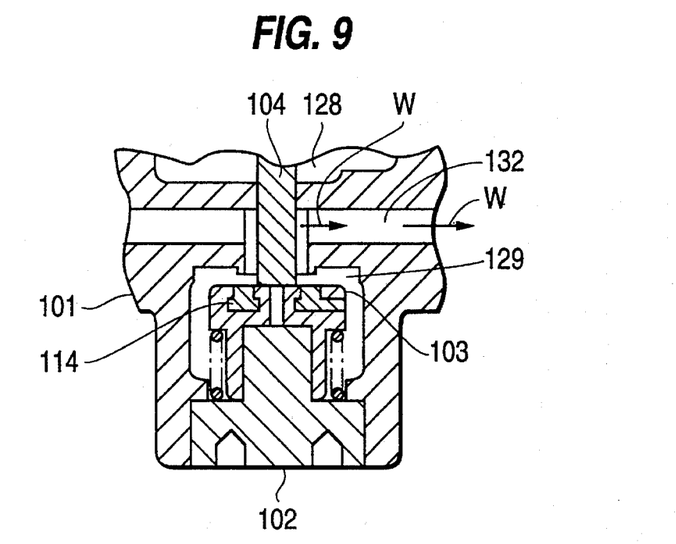
FIG. 9 is an enlarged view of certain portions of FIG. 5 showing the pressure regulating pilot valve in its opened state.

When the secondary pressure in the secondary side piping 2P is lower than the set value, the water pressure in the operation chamber 128 is reduced to displaces the diaphragm 108 downward. Accordingly the valve disk 103 is pushed down by the spring 110 and moved away from the valve seat 133 resulting in the valve opening as shown in FIG. 9.

As a result, since the valve chamber 129 is in communication with the cylinder connecting opening 127 through the bore 132, the pressurized water W flows into the cylinder primary side chamber 23 of the regulating valve NSV so as to increase the pressure within the cylinder primary side chamber 23. The piston 3 of the pressure regulating valve NSV is displaced toward the valve opening direction and the pressure regulating valve NSV is opened resulting in the pressure of the primary side 28 being introduced into the secondary side piping 2P.

As the secondary pressure is increased due to the introduction of the primary pressure into the secondary side, the valve disk 103 of the pressure regulating pilot valve PV moves towards the closed position.

The degree of opening of the valve disk 103 is balanced by the elastic force of the spring 111 within the valve chamber 129, a force acting upon the valve disk 103 by the primary pressure, a force acting upon the diaphragm 108 by the water pressure within the secondary side piping 2P, and the elastic force of the spring 110 which presses the diaphragm 108 in the valve opening direction. The primary pressure on the valve 103 is offset so that fluctuation in water pressure within the primary side piping 1P does not affect the opening and closing of the valve disk 103.

Figure 7:
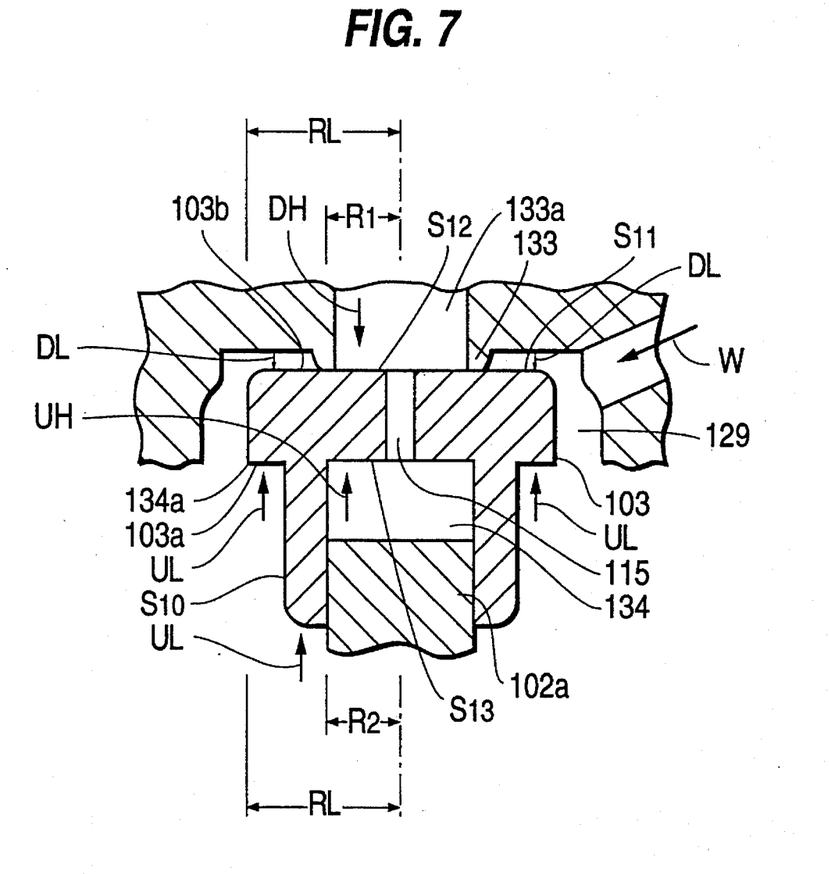
FIG. 7 is an enlarged view of certain portions of FIG. 5.

That is, in FIG. 7, the primary pressure within the valve chamber 129, during opening/closing of the valve disk 103, acts upon the stepped pressure receiving surface S10 of the lower surface 103a of the valve 103 and the pressure receiving surface S11 on the upper surface 103b outside of the seating area. A force UL in the valve closing direction acts upon the pressure receiving surface S10 and the pressure receiving area for the force UL is $\pi (RL^2 - R2^2)$. On the other hand, a force DL in the valve opening direction acts upon the pressure receiving surface S11 and the pressure receiving area for the force DL is $\pi (RL^2 - R1^2)$.

Since, as described above, the radius R1 and the radius R2 are equal to each other, the respective pressure receiving areas of the pressure receiving surfaces S10 and S11 are equal to each other. For this reason, the forces UL and DL acting upon the valve disk 103 offset each other so that the valve disk 103 is not affected by a pressure change within the valve chamber 129.

The cylinder pressure of the cylinder primary side chamber 23 of the pressure regulating valve NSV acts upon the interior of the cylinder 134. Such cylinder pressure acts upon pressure receiving surface S12 inside of the seating area of the valve disk 103 and upon the inner side pressure receiving surface S13 of the cylinder 134. A force DH in the valve opening direction acts upon the pressure receiving surface S12 and the pressure receiving area for the force DH is $\pi R1^2$. On the other hand, a force UH in the valve closing direction acts upon the inner side pressure receiving surface S13 of the cylinder and the pressure receiving area for the force UH is $\pi R2^2$.

Since the radius R1 and the radius R2 are equal to each other, the respective pressure receiving areas of the pressure receiving surfaces S12 and S13 are equal to each other. As a result, the forces DH and UH acting upon the valve disk 103 cancel each other and the valve disk 103 is not affected by fluctuation in the cylinder pressure.

Figure 10:
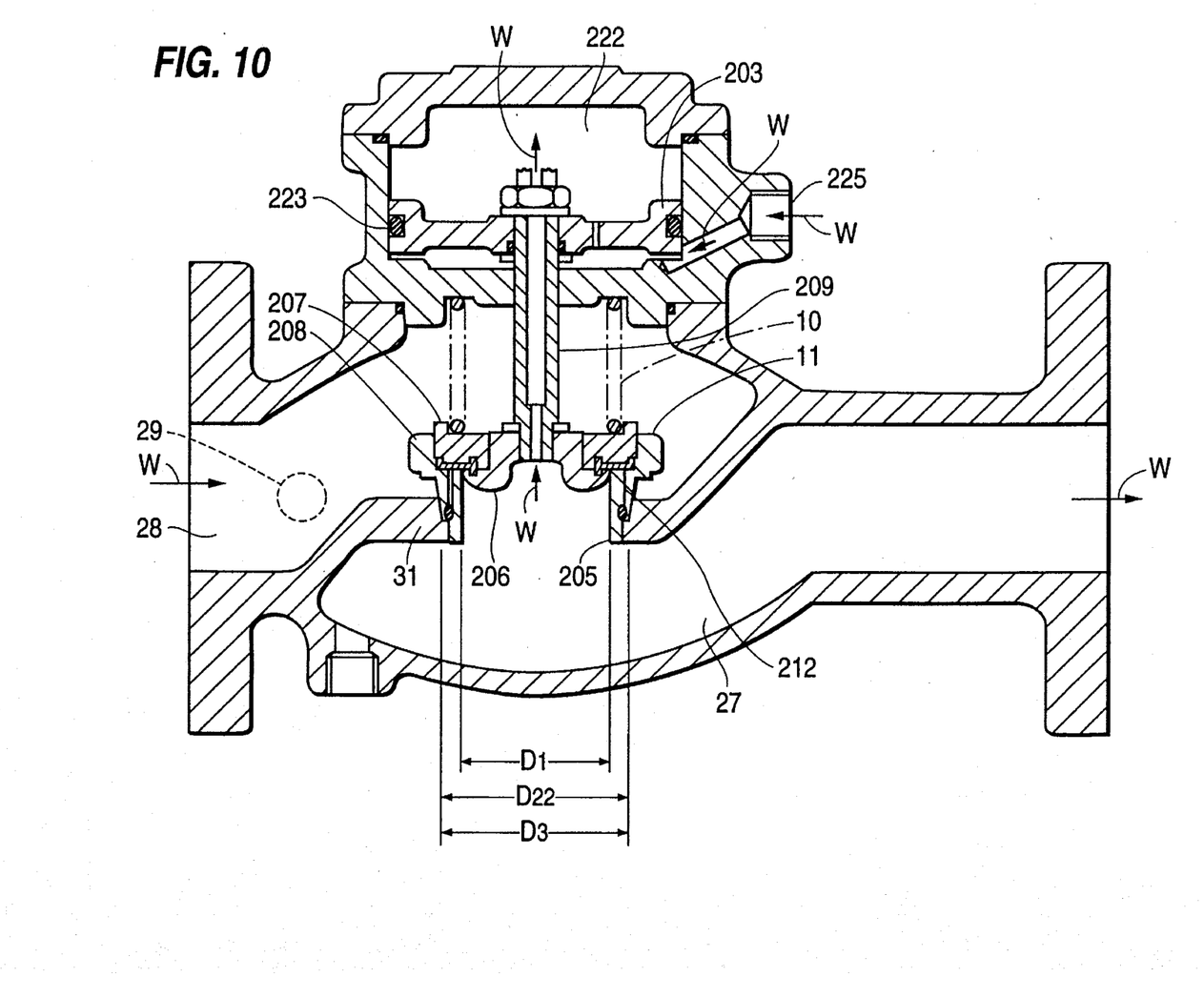
FIG. 10 is a longitudinal sectional view showing a modification of the pressure regulating valve.

It should be noted that a pressure regulating valve as shown in FIG. 10 may also be used. In the pressure regulating valve of FIG. 10, the pressure of the primary side 28 acts upon the upper surface of a main valve 206 so as to impart to the main valve 206 a force in the valve closing direction. The inner peripheral surface of the skirt 212 abuts the outer peripheral surface of the seat ring 205. The inner diameter (fitting diameter) D22 of the skirt 212 and the outer diameter D3 of the seat ring 205 are formed to be substantially equal to each other. In FIG. 10, numeral 222 denotes an internal valve chamber which is in communication with the secondary side 27 through a bypass bolt 209 and numeral 223 denotes a cylinder chamber which is in communication with a pressure application opening 225 so as to cause an up and down movement of a piston 203. This provides similar advantages to those realized in the pressure regulating valve shown in FIGS. 2 and 3.

Figure 11:
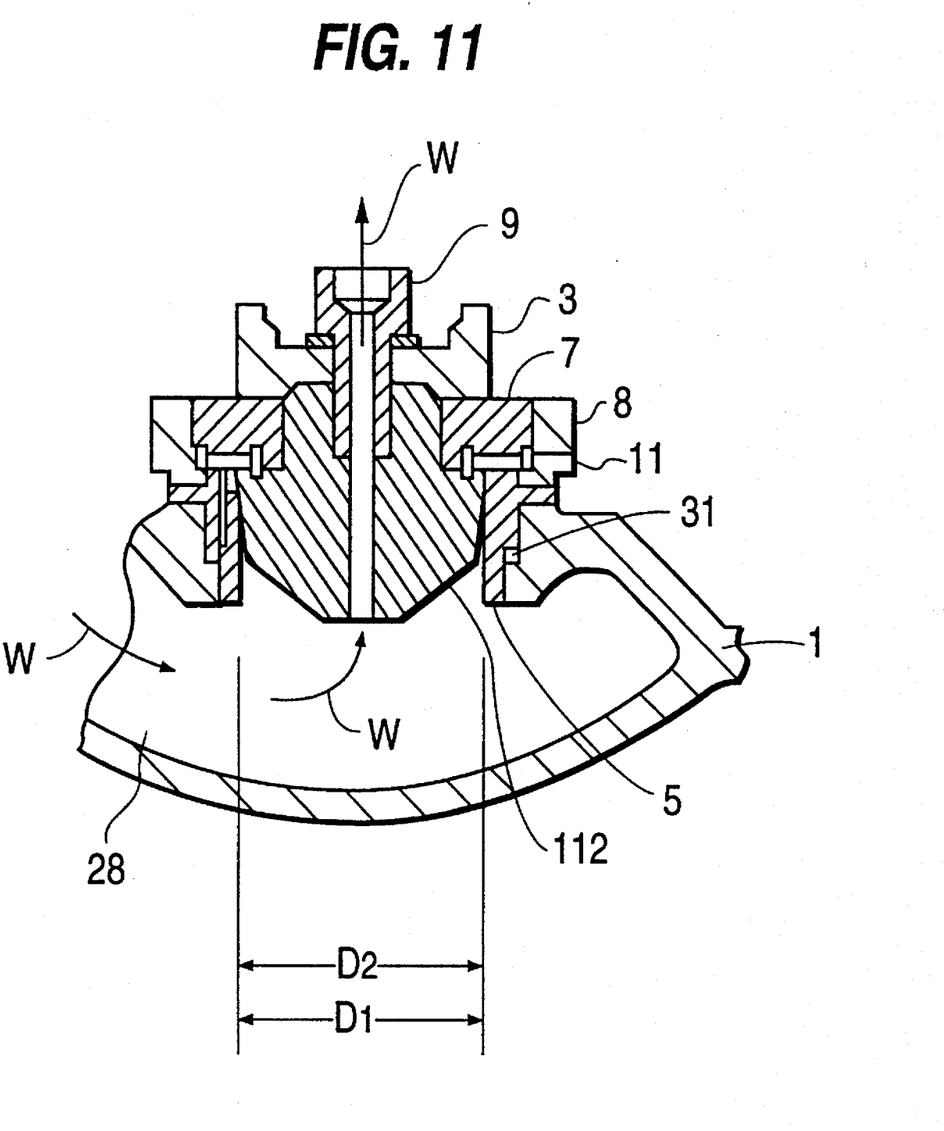
FIG. 11 is a sectional view of certain portions showing another modification of the pressure regulating valve.

Further, in the pressure regulating valve shown in FIGS. 2 and 3, instead of the skirt 12 on which the plurality of slits 12a is formed, a skirt 112 having a cross section in the form of an inverted trapezoid as shown in FIG. 11 may be used to achieve similar advantages.

What is claimed is:

1. A pressure regulating system comprising a pressure regulating valve and a pressure regulating pilot valve, said pressure regulating valve including:
    a valve body having a primary side and a secondary side,
    a main valve isolating said primary side from said secondary side,
    a piston having a through hole and being fixed on a secondary side of said main valve, and
    a tubular guide portion formed within said valve body and to which said piston is slidably fitted so that an internal valve chamber on said secondary side of said main valve is defined by said piston and said tubular guide; and
wherein said main valve has a through hole communicating with said through hole in said piston for permitting communication between said primary side of said valve body and said internal valve chamber, and said main valve has a first surface area that receives pressure in a main valve closing direction from said internal valve chamber and a second pressure receiving surface area which is smaller than said first surface area and receives pressure in a main valve opening direction.

2. A pressure regulating system comprising a pressure regulating valve and a pressure regulating pilot valve, said pressure regulating valve including:
    a valve body having a primary side and a secondary side,
    a main valve provided in said valve body and isolating said primary side from said secondary side, a cylindrical valve seat provided in said valve body and being operatively associated with said main valve, a flow inlet formed in said valve seat and provided for detecting the presence of flowing water; and a skirt provided on said main valve and having an outer wall portion fitted to engage said primary side of said valve seat.

3. A pressure regulating system comprising a pressure regulating valve and a pressure regulating pilot valve, said pressure regulating pilot valve including:

a valve chamber having a valve seat defining an opening therethrough, a primary pressure connecting opening communicating with said valve chamber and through which primary pressure is introduced, a valve disk having a seating surface disposed within said valve chamber, means for biasing said valve disk against said valve seat, a shaft for engaging said seating surface of said valve disk, a diaphragm fixed to said shaft, a secondary pressure connecting opening communicating with a secondary side of said pressure regulating valve, and an operation chamber in which said diaphragm is disposed and which is in communication with said secondary pressure connecting opening; and said valve disk including a first surface area that receives pressure from the primary pressure source in a valve opening direction and a second surface area that receives pressure from the primary pressure source in a valve closing direction, wherein said first and second areas are substantially equal.

4. The pressure regulating system as claimed in claim 3, wherein said pressure regulating valve includes: a valve body; a main valve isolating a primary side of said valve body from a secondary side of said valve body; and an internal valve chamber formed on a secondary side surface of said main valve and provided in communication with said primary side of said valve body.

5. The pressure regulating system as claimed in claim 4, wherein said main valve of said pressure regulating valve has a first surface area that receives pressure in a valve closing direction from said internal valve chamber and a second surface area that receives pressure in a valve opening direction, wherein said main valve first surface area is larger than that of said first main valve second surface area.

6. The pressure regulating system as claimed in claim 5, wherein said pressure regulating valve further includes: a piston fixed on the secondary surface of said main valve, a cylinder case accommodating said piston and defining a cylinder chamber radially outwardly of said piston, a tubular guide portion which is formed within said cylinder case and to which said piston is slidably fitted a partition between said cylinder chamber and said secondary side of said main valve, an angular wall portion formed on an outer peripheral portion of said piston and engaging an inner surface of said cylinder case to partition said cylinder chamber into a cylinder primary side chamber and a cylinder secondary side chamber, and a through hole formed in said horizontal wall portion and providing communication between the cylinder primary side chamber and the cylinder secondary side chamber;

said internal valve chamber being defined by said piston and said tubular guide.

7. The pressure regulating system as claimed in claim 6, wherein said pressure regulating valve further includes a bypass bolt extending through said piston and said main valve.

8. The pressure regulating system as claimed in claim 6, wherein said pressure regulating pilot valve is connected to said cylinder primary side chamber of said pressure regulating valve.

9. The pressure regulating system as claimed in claim 1, wherein said pressure regulating pilot valve further includes: a cylinder provided on a surface of said valve disk opposite to said seating surface and having an inner diameter which is equal to the diameter of the opening defined by said valve seat, and a guide portion slidably engaging said cylinder;

said valve disk having a through hole for providing communication between said cylinder and said seating surface.

10. The pressure regulating system as claimed in claim 1, wherein said pressure regulating valve further includes: a cylinder case accommodating said piston and defining a cylinder chamber radially outwardly of said piston; a partition between said cylinder chamber and a secondary side of said valve body; an annular wall portion formed on an outer peripheral portion of said piston and engaging an inner surface of said cylinder case to partition said cylinder chamber into a cylinder primary side chamber and a cylinder secondary side chamber; and a through hole formed in said annular wall portion and providing communication between the cylinder primary side chamber and the cylinder secondary side chamber.

11. The pressure regulating system as claimed in claim 10, wherein said pressure regulating valve further includes a bypass bolt extending through said piston through hole and said main valve through hole for providing communication between said internal valve chamber and said primary side of said valve body.

12. The pressure regulating system as claimed in claim 10, wherein said pressure regulating pilot valve is connected to said cylinder primary side chamber of said pressure regulating valve.

13. The pressure regulating system as claimed in claim 10, wherein said pressure regulating valve further includes: a short tubular portion formed on said secondary side of said valve body through which a secondary pressure extracting opening is formed, said pressure regulating pilot valve being connected to said secondary pressure extracting opening.

14. The pressure regulating system as claimed in claim 9, wherein said valve disk of said pressure regulating pilot valve has a pressure receiving surface outside the seat serving as said first surface and a stepped pressure receiving surface serving as said second surface area.

15. The pressure regulating system as claimed in claim 2, wherein said skirt of said pressure regulating valve has an outer diameter which is the same as the outer diameter of said valve seat.

16. The pressure regulating system as claimed in claim 2, wherein said skirt of said pressure regulating valve has a fitting diameter which is the same as the inner diameter of said valve seat.

17. The pressure regulating system as claimed in claim 2, wherein said skirt of said pressure regulating valve is a right circular cylinder having a plurality of longitudinally extending slits.

18. The pressure regulating system as claimed in claim 2, wherein said skirt of said pressure regulating valve has a cross section in the shape of an inverted trapezoid.

* * * * *